J. M. SHARP.
HOOK FOR CHAINS.
APPLICATION FILED JAN. 28, 1909.
944,970.
Patented Dec. 28, 1909.
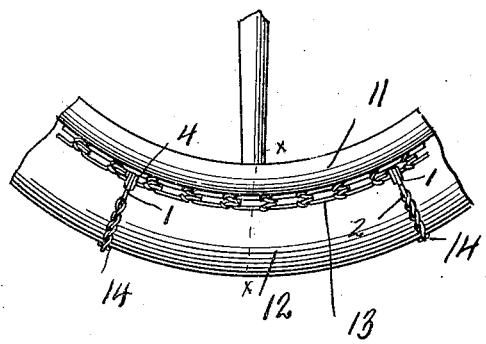
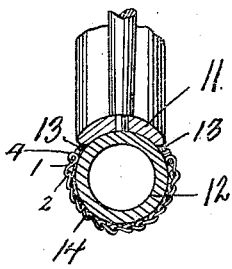
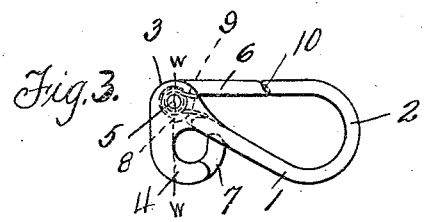
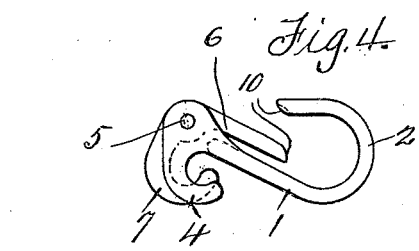
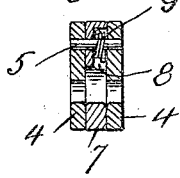
Witnesses
Inventor
J. M. Sharp
By
Attorneys

UNITED STATES PATENT OFFICE.

JOSEPH M. SHARP, OF PITTSBURG, PENNSYLVANIA.

HOOK FOR CHAINS.

944,970.   Specification of Letters Patent.   Patented Dec. 28, 1909.

Application filed January 28, 1909. Serial No. 474,659.

*To all whom it may concern:*

Be it known that I, JOSEPH M. SHARP, a citizen of the United States of America, residing at Pittsburg, in the county of Allegheny and State of Pennsylvania, have invented certain new and useful Improvements in Hooks for Chains, of which the following is a specification, reference being had therein to the accompanying drawing.

This invention relates to hooks for chains, and more particularly to a compound snap hook for attaching two chains together.

The primary object of my invention is to provide a compound snap hook that can be advantageously used in connection with the guards of automobile tires, for connecting the tread chains of the guards to the circumferential chains thereof, whereby when one of the tread chains is broken, the chain can be easily and quickly removed and renewed.

Another object of this invention is to provide a compound snap hook of a strong and durable construction consisting of comparatively few parts, quickly assembled and easily manipulated to open or close the hook.

With the above and other objects in view which will more readily appear as the invention is better understood, the same consists in the novel construction, combination and arrangement of parts to be hereinafter described and claimed.

Referring to the drawings:—Figure 1 is an elevation of a portion of a chain guard of an automobile tire, illustrating my hook in connection therewith, Fig. 3 is a cross sectional view taken on the line $x$—$x$ of Fig. 1, Fig. 3 is an enlarged elevation of the hook in a closed position, Fig. 4 is a similar view of the hook in an open position, and Fig. 5 is a cross sectional view taken on the line $w$—$w$ of Fig. 3.

My compound snap hook comprises a shank 1 having one end thereof bent to provide a top bill 2, while the opposite end is bifurcated and shaped to provide two apertured lugs 3 and two depending curved bottom bills 4. The apertures of the lugs 3 are diametrically opposed for a pin 5, which is fixed in said lugs to serve functionally as a pivot pin for a main latch 6 having a depending curved bottom latch 7. The main latch 6 is adapted to engage the end of the top bill 2, while the bottom latch 7 is adapted to swing between the bottom bills 4 and engage the under side of the shank 1, said bills and said latches providing inclosures for the links of the chain, as will presently appear. The side of the main latch adjacent to the apertured lugs 3 is recessed, as at 8, for a coil spring 9 arranged upon the pivot pin 5, one end of said spring engaging under the main latch 6, while the opposite end of said spring engages in the bifurcation of the shank 1. The confronting ends of the latch 6 and the bill 2 are beveled, as at 10, to provide a smooth and uninterrupted surface for a link inclosed by said latch and said bill, while the ends of the bottom bills 4 and the bottom latch 7 are rounded to permit of a link being easily placed in position to be inclosed by the bottom latch and the shank 1.

In Figs. 1 and 2 of the drawings, I have illustrated the felly 11 of an automobile wheel as having a tire 12, and arranged circumferentially of this tire adjacent to the felly 11 are chains 13. In conjunction with the chains 13 a plurality of tread chains 14 are used, said chains constituting the guard of the tire 12 for preventing said tire from being punctured or injured by sharp stones, glass or obstructions upon a road. For connecting the chains 14 to the chains 13, I use my compound snap hooks, these hooks permitting the chains 14 being easily removed and renewed when broken.

It will be observed from the foregoing description taken in connection with the drawings, that I have devised a double snap hook having oppositely disposed bills closed by a double latch, the latch being arranged to simultaneously provide two inclosures for the links of two chains.

The hooks are made of strong and durable metal, and while in the drawings forming a part of this application there is illustrated the preferred embodiments of my invention, I would have it understood that the same can be varied or changed without departing from the spirit of the invention.

Having now described my invention what I claim as new, is:—

1. A compound snap hook comprising an inclined shank having one end bent upon itself to provide a curved bill and its other end formed with a pair of apertured lugs, and a pair of depending curved bills, a main latch pivotally mounted between said lugs, arranged over said shank and adapted to have one end engage said top bill and its other end provided with a curved portion constituting a bottom latch extending between said depending curved bills, and adapted to engage one side of the shank, and means for maintaining said latches in engagement with the top bill and shank.

2. A compound latch comprising an inclined shank having one end bifurcated and further provided with a pair of curved bills at said end, said shank having its other end bent to provide a curved top bill, and means to constitute a main latch, and a bottom latch pivoted to the bifurcated end of said shank, said bottom latch curvilinear in contour and extending between the curved bills and adapted to engage one side of the shank, said main latch projecting laterally from said lugs and adapted to engage said top bill.

In testimony whereof I affix my signature in the presence of two witnesses.

JOSEPH M. SHARP.

Witnesses:
MAX H. SROLOVITZ,
A. J. TRIGG.